Dec. 19, 1939.   G. DALKOWITZ   2,183,549
ELECTRIC MOTOR
Filed Oct. 26, 1936
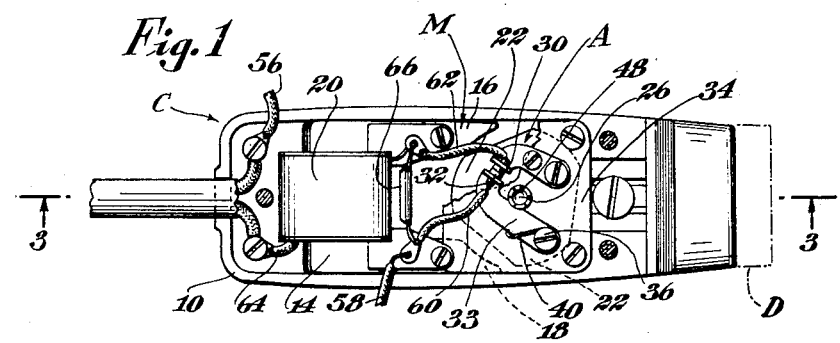
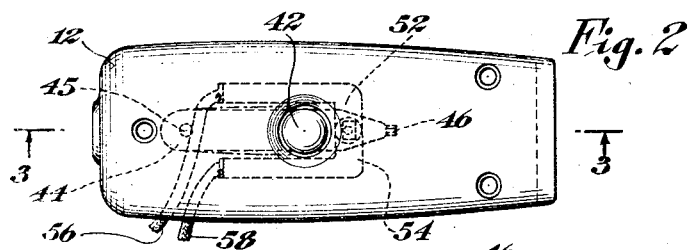
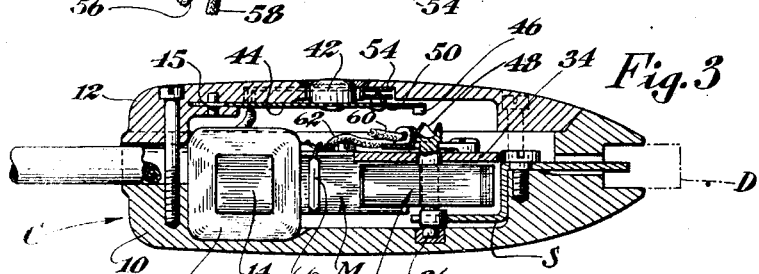
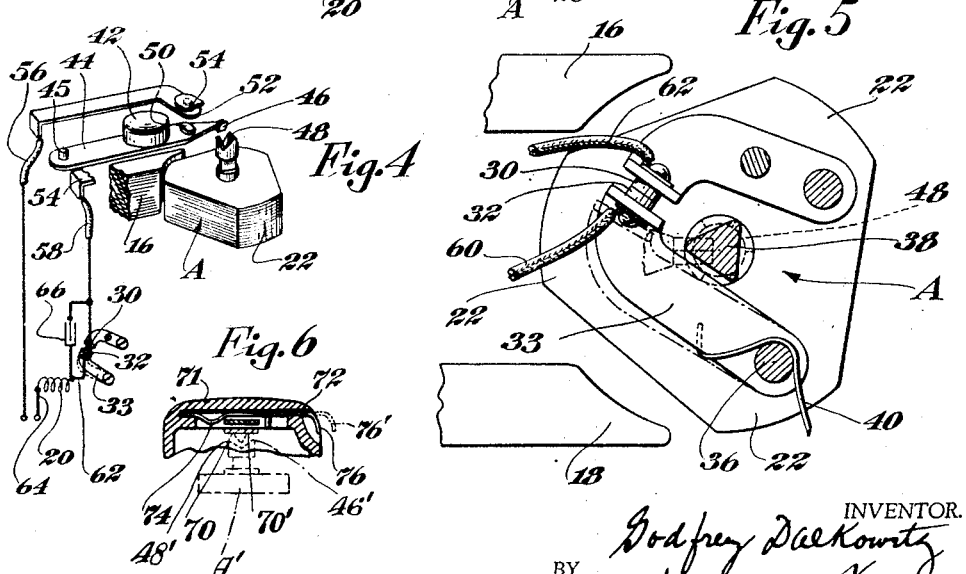
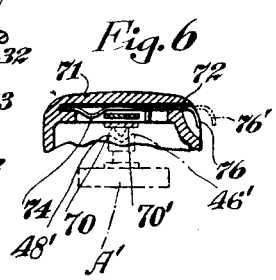
INVENTOR.
Godfrey Dalkowitz
BY
William Bluer
ATTORNEY.

Patented Dec. 19, 1939

2,183,549

UNITED STATES PATENT OFFICE 2,183,549

ELECTRIC MOTOR

Godfrey Dalkowitz, New York, N. Y., assignor to American Safety Razor Corporation, Brooklyn, N. Y., a corporation of Virginia Application October 26, 1936, Serial No. 107,544

17 Claims. (Cl. 172—36)

This invention relates generally to electric motors of the type known as magnetic impulse motors and intended for actuating a shaving device and more particularly to a starting mechanism for such type of motor.

A simple motor of the magnetic type will comprise, in general, an electromagnet having two poles, and which is intermittently energized by a make-and-break device operated in synchronism with the rotation of the armature, which consists of iron without any winding. The timing of the circuit breaker is so arranged that the field is energized only when the armature is in such a position that it will receive an impulse causing it to align itself with the poles, that is, to move into a position where the flux path through field and armature is shortest. Before the armature has reached this pole-aligning position, however, the circuit is interrupted, with the result that the armature due to its inertia, continues its rotation beyond the pole-alignment point and to a point where the circuit is again energized, where it receives another impulse urging it in the same direction.

It is customary, in order to start a motor of this type, to give the armature an initial impulse causing it to rotate, and many forms of mechanism have been devised for this purpose. My invention, however, utilizes a different principle for starting the motor, in which no initial rotary impulse is given to the armature by mechanical means.

As will appear from the foregoing description of the operation, such a motor will not start from rest automatically except in particular relative positions of field and armature. For instance, if the armature is in the aforementioned pole alignment position, the motor cannot start, because the field is not energized. However, even if the field were energized, the armature being in its pole alignment position would be in a position of stable equilibrium and therefore would not move. If on the other hand, the armature is brought out of its pole alignment position into such a position that, when the field is energized, a sufficient impulse is given to it to reach the next position of energization, the motor will start by itself as soon as the current is turned on. It is this characteristic of a magnetic motor that I have utilized in my invention.

It is among the general objects of my invention to provide a simplified and more efficiently operative motor for a shaving instrument and a simple and effective means whereby a motor of the type described may be caused to start when desired, to provide a starting means for such a motor, that, besides serving to start the motor, is also, by suitable manipulation adapted to cause the motor to stop when desired, and further to provide a starting means for a motor of the type described that will be protected against accidental manipulation, and further one that will be compact, and inexpensive and particularly adapted for use in connection with a shaving device of the type disclosed herein, which is intended to be grasped by the hand, and in which therefore, compactness and convenient location of parts are required.

For the attainment of these objects and such other objects as will hereinafter appear or be pointed out, I have shown several illustrative embodiments of my invention in the drawing, in which:

Figure 1 is a top plan view of a motor of the magnetic type showing my invention applied thereto, this motor being shown as mounted in the casing of a shaving device, of the clipper type, and the casing having its cover removed, so as to expose the interior;

Figure 2 is a plan view showing the cover for the casing shown in Figure 1;

Figure 3 is a sectional view on the line 3—3 of Figures 1 and 2, looking in the direction of the arrows, showing the cover of Figure 2 in place in the casing of Figure 1;

Figure 4 is a view, partly diagrammatic and partly in perspective, showing the electrical connections and also the mechanical features of the starting mechanism apart from the details of the particular application thereof shown in Figures 1 to 3;

Figure 5 is a detail view on a greatly enlarged scale and intended to illustrate the operation of the make-and-break device of the motor; and Figure 6 is a sectional view illustrating a modified form of my invention.

Referring now to the drawing in detail, it will be observed that I show therein a motor M mounted within a casing C, and arranged to actuate a shaving device of the clipper type, indicated in dotted lines at D, through the pivoted lever S. The casing C comprises a body portion 10 and a cap or cover 12, held to the body portion in any suitable or preferred manner, as by the screws shown in the drawing. The cap or cover 12 is shown as carrying portions of the starting mechanism including the appurtenant electrical connections.

The motor is shown as comprising a stationary electromagnet 14 constituting the field of the motor and of generally U or horse-shoe shape, having two poles 16 and 18 and a field coil 20, for magnetizing the same.

The field magnet 14 is shown as being of the usual laminated core construction, and it will be understood of course that the laminations are made of electrical steel of suitable properties. The field poles 16 and 18 have arcuately contoured ends, so that they are adapted to lie closely adjacent to the cylindrical end surfaces of the poles of armature A, which is also shown as of laminated electrical steel construction, and as having three evenly spaced poles indicated at 22. The armature is shown as mounted on a shaft 26, journalled in the casing 10 or extensions thereof in any suitable or preferred manner.

On viewing Figures 1 and 3 it will be observed that the poles of the field magnet are so related to the poles of the armature that each pair of poles of the armature is adapted to become aligned with the poles of the field and to form a magnetic bridge between the poles.

Because of the well known principles of magnetism, it follows that, when the field is energized, the armature will tend to assume a position in which two poles thereof become aligned with the field poles 16 and 18, this being the position in which the flux path is a minimum, and the flux in the magnetic circuit is a maximum, and this position being one of stable equilibrium.

If the armature is positioned as shown in Figure 1 with one pole thereof intermediate the field poles 16 and 18 and the field is then energized, the armature will obviously tend to assume said aforementioned position of stable equilibrium in which it is aligned with the poles. Since, if one armature pole is positioned exactly half way between the field poles, the armature would be in what theoretically is a dead center position, because the pull in both sides is balanced, I have shown the armature pole displaced slightly to one side of such theoretical dead center position, and have intended this to represent a self-starting position of the armature.

In order to cause the operation of the motor as described, a make-and-break system is associated with the electrical circuit of the field and the operation of this make-and-break is so timed that when the armature is in the position shown in Figure 1, the field is energized, whereby the armature is given an impulse tending to cause two of its poles to align themselves with the field poles. Before the armature reaches such aligned position, however, the field is deenergized, and the armature, by reason of its inertia, moves beyond the aligned position and into a position in which the next armature pole assumes the position shown in Figure 1, when the field is again energized, and the armature receives another impulse, and so on, so that a continuous rotation of the armature results.

In order to accomplish this making and breaking of the field current I have illustrated a pair of electric contacts 30 and 32, the first of these being shown as mounted in any suitable or preferred manner, as for example on a plate 34, carried by the casing 10, and which is of insulating material, while the contact 32 is carried by a lever 33, mounted so as to pivot about the screw 36, also shown as carried by plate 34, and by its movement to make and break the electrical circuit.

In order to cause movement of the contact 32 a cam 38 is provided on the armature shaft, and this cam, as clearly appears from Figure 5, may be described as approximately triangular in shape. As it rotates the projecting portions thereof will press against the lever 33 and will cause it to move so that the contact 32 moves away from the contact 30. In order to cause the return of the lever 33 into its contact making position a spring 40 is shown as positioned so as to press against said lever 33 and cause it to move into a contact making position whenever the cam is not active thereon.

It will be observed that the cam has three active portions, so that during each rotation of the armature shaft the circuit is made and broken three times and these makings and breakings are so timed that they take place at such times, as heretofore explained, as to cause proper operation of the motor.

I will now explain the details of my starting mechanism as applied to the motor just described. I have solved the problem involved in causing the starting of the motor by bringing the armature into a position from which it will start rotating automatically as soon as the current is turned on. To accomplish this purpose I have provided an arrangement including a push button 42, on depression of which the electrical circuit will first of all be interrupted so that the field will be deenergized, and the armature will be free to rotate, as it is not under the influence of any magnetic forces, and while this condition exists, the armature is caused to assume a proper automatic starting position, as shown in Figure 1.

For this purpose I have shown the push button 42 as mounted on a movable element 44, shown by way of example as a leaf spring having one end mounted in the cover 12 and carrying on its free end a wedge-shaped member 46, adapted, when depressed from its position of Figure 3 or Figure 4, to engage one of the three V-shaped cam surfaces 48, arranged on the end of the armature shaft. It will be seen that the pressure of the inclined sides of the member 46 against the inclined surfaces of the V's, will cause the armature shaft to move to one side or the other, and to finally assume a position in which the wedge 46 rests centrally in the V-groove. The inclined surfaces of the V's 48 are so positioned in relation to the poles of the armature that when the member 46 is so centered in relation to one of the V's the armature will be in a self-starting position. In order to prevent any possibility of the member 46 engaging one of the peaks formed between two adjacent V-grooves, the element 44 is mounted, as on pin 45, so as to be capable of limited pivotal movement, whereby the member 46 may move to a slight extent to one side or the other, so as to avoid the aforesaid peak, if it should strike one. It will be understood that the walls of the cover 12 are cut away sufficiently to permit such lateral movement, and the opening through which button 42 passes is made sufficiently large to permit sidewise movement of the button. Lateral movement of the tip of member 46 is further aided by the yieldability of the resilient element 44.

It has already been mentioned that during this period of adjustment of the armature into a self-starting position, the electrical circuit for the field is to be broken, and for this purpose the member 44 is shown as carrying an element 50, adapted to engage the resiliently mounted contact 52, and to press it against a fixed contact 54, when the push button is in its uppermost position, but to become disengaged therefrom so as to release the contact 52 and thereby to break the field circuit when the push button 42 is depressed. In the showing of Figure 4, the contacts 52 and 54 are separated because the button 42, and the element 50 are depressed. In Figure 3, on the other hand, the contacts 52 and 54 are shown in engagement, and the button 42 and element 50 are in their uppermost position.

The movable contact 52 is shown as connected to one of the wires 56 leading to the current supply, while the fixed contact 54 is shown as connected by wires 58 and 60 to contact 32, and one terminal of the field coil 20 is connected by a conductor 62 to the contact 30. The other terminal of the field coil 20 is shown as connected to the other wire of the current supply by a conductor 64. A condenser 66 is shown as shunted across the contacts 30 and 32, for the well known purpose of securing efficient making and breaking.

It will be clear that the contacts 52 and 54 perform the function of a switch which is normally closed, and unless the push button 42 is depressed the motor is capable of normal operation as a result of the functioning of the contacts 30, 32. When the push button 42 is depressed a sufficient amount of field circuit is opened and the motor is incapable of operation. On continuing the depression of the button 42 sufficiently, the member 46 will enter one of the V grooves 48 and bring the armature into a starting position while at the same time the contacts 30 and 32 are brought into electrical contact. On thereafter releasing the button 42 the contact 52 will be pressed against the contact 54, the field will be energized, and the motor will receive a starting impulse and thereafter continue in normal operation.

Referring now to Figure 6 I have there shown a modification of my invention in which a member 70, corresponding to the member 44 of the other figures, is pivotally mounted within the cover 71, corresponding to the cover 12. The member 70, however, carries no push button. For the purpose of operating it I make use of an element 72 slidably mounted within the cover 71 and provided at one point thereof with a cam surface 74. When the element 72 is drawn outward by means of its projecting portion 76 so that the latter moves into the position indicated in dotted lines at 76', the cam 74 will move the member 70 into a position 70', also shown in dotted lines, and which corresponds to a position in which the armature will have been brought into a self-starting position. On pushing the element 72 back into the cover 71 the member 70 will move up into its contact making position and the motor will start.

The advantage of the construction of Figure 6 resides in the protection that is afforded against stoppage of the motor after it is in operation, due to accidental manipulation of the switch member 70, since, when the motor is in operation, the member 76 is in its inner shielded position in which it is protected against accidental withdrawal which would of course stop the motor. In the construction of the other figures, on the other hand, it may happen that the button 42 is accidentally depressed during the use of the device, thereby stopping the motor at an inopportune moment.

While I have herein disclosed several illustrative embodiments of my invention, it will be understood that the same may be embodied in many other forms, as will be obvious to those skilled in the art, without departing from the spirit thereof, and it will be further understood that the disclosure herein is not to be construed in a limiting sense, but by way of illustration merely, and that I do not limit myself in any way other than as called for by the prior art.

Having thus described my invention and illustrated its use, what I claim as new and desire to secure by Letters Patent, is:

1. In a starter for a magnetic motor, means for bringing the armature shaft into a starting position, said means comprising a multiple V-shaped cam surface on the armature shaft of the motor, with the bottom of each V thereof substantially in radial alignment with the median radial line of each pole of the armature, a circuit make-and-break device for causing the intermittent energization of the field of said motor, and means for timing the initial point of each circuit closing interval of said make-and-break device to correspond with a starting position of the armature, and a movable member for closing and opening the field circuit of the motor in series with said make-and-break device, said member being adapted to return automatically to a circuit closing position, and said member having portions thereof adapted to cooperate with said cam surface so that when it is moved away from its circuit closing position it may move into one of said V's and move said armature shaft and armature into a starting position.

2. In a starter for a magnetic motor, means for bringing the armature shaft into a starting position, said means comprising a cam surface on the armature shaft of the motor, and a member movable between two limiting positions for closing the electric circuit of the motor when said member is in one of its limiting positions, and said member having portions thereof adapted to cooperate with said cam surface so that when it is moved away from its circuit closing position and into its other limiting position it is adapted to move said armature shaft into said starting position.

3. In a starter for a magnetic motor, said motor having a rotatable armature shaft and a multipolar armature carried thereby, means for bringing the armature shaft into a starting position, said means comprising a multiple V-shaped cam surface on the armature shaft of the motor with the bottom of each V substantially in radial alignment with the median radial line of each pole of the armature, a circuit make-and-break device for causing the energization of the field of said motor, and means for timing said make-and-break device so that it initiates energization of the field only when the armature is in a starting position, and means adapted to engage said cam surface so as to bring said armature into a starting position, and thereafter to close circuit making means in series, with said make-and-break device.

4. In a starter for a magnetic motor, means for bringing the armature shaft into a starting position, said means comprising a cam surface on the armature shaft of the motor, and a movable member for closing the electric circuit of the motor, and said member having portions thereof adapted to cooperate with said cam surface so that it may be moved away from its circuit closing position to move said armature shaft into a starting position.

5. In a motor starting device for a magnetic motor having a field circuit and a rotable armature, a resilient member adapted to move the armature into a starting position when said member is moved out of its normal position, a fixed electrical contact, a resilient electrical contact adapted to engage said fixed contact but in its normal position being in spaced relation therefrom, means on said resilient member adapted to press said movable contact against said fixed contact when said member is in its normal position, a means carried by said member for manipulating said member, and said fixed and said movable contacts forming part of the field circuit of the motor and being adapted to close the field circuit of the motor when they are in contact and to open the field circuit when they are in spaced relation.

6. In combination, a casing having a body and a cover, a magnetic motor within said casing, and a starting device in said cover, said starting device including a resilient member adapted to move the armature into a starting position when said member is moved out of its normal position, a fixed electrical contact, a resilient electrical contact adapted to engage said fixed contact but in its normal position being in spaced relation therefrom, means on said resilient member adapted to press said movable contact against said fixed contact when said member is in its normal position, a push button carried by said member for manipulating said member and said fixed and said movable contacts forming part of the field circuit of the motor and being adapted to close the field circuit of the motor when they are in contact and to open the field circuit when they are in spaced relation.

7. In a starter for a magnetic motor, elements fixedly associated with the armature shaft of the motor, means for interrupting the current supply to the motor, said means comprising a fixed contact and a movable contact, said movable contact being movable from its position of contact with said fixed contact to break the motor circuit and thereby stop the motor, however leaving the armature shaft free to rotate, and movable still farther away from its position of contact with said fixed contact to engage said elements fixedly associated with said armature shaft and thereby to cause rotational movement of said armature shaft into a predetermined position.

8. In a starter for a magnetic motor, elements fixedly associated with the armature shaft of the motor, means for interrupting the current supply to the motor, said means comprising a fixed contact and a movable contact, said movable contact being movable from its position of contact with said fixed contact to break the motor circuit and thereby stop the motor, however leaving the armature shaft free to rotate, and movable still farther away from its position of contact with said fixed contact, to engage said elements fixedly associated with said armature shaft and to move said armature shaft into a self-starting position.

9. In a starter for a magnetic motor, means for interrupting the current supply to the motor, said means comprising a pair of relatively movable contacts, adapted to make or to break the circuit, a member fixedly associated with the armature shaft of the motor, and means associated with one of said contacts for moving the same into and out of contact so as to make or break the circuit and adapted, when said contacts are in circuit-breaking position, to contact with said member fixedly associated with the armature shaft to cause the latter to rotate.

10. In a starter for a magnetic motor, means for interrupting the current supply to the motor, said means comprising a pair of relatively movable contacts, adapted to make or to break the circuit, a member fixedly associated with the armature shaft of the motor, and means associated with one of said contacts for moving the same into and out of contact so as to make or break the circuit and adapted, when said contacts are in circuit-breaking position, to contact with said member fixedly associated with the armature shaft to cause the latter to rotate into a self-starting position.

11. In a motor starter for a magnetic motor, movable means for bringing the armature of the motor into a starting position, said means being automatically movable into a normal position permitting the operation of the motor after the armature has been brought into its starting position and a second movable means movable into either one of two limiting positions, and adapted, when moved into one of its limiting positions, to move said first mentioned means so as to cause it to move said armature into the said starting position, and when moved into its other limiting position to permit said first mentioned means to assume its position permitting operation of said motor, said second means when in said last mentioned position being shielded against external displacement.

12. A starter for a magnetic motor enclosed in a casing, said starter having means adapted to automatically assume a normal position, and to be moved out of said normal position into a position in which it causes the armature of the motor to assume a starting position, and a second means adapted to move said first mentioned means into said armature starting position, said second means having a portion thereof adapted to project out of the casing when said first means is moved into a position to cause the armature to assume said starting position, while when said second means is in a position so that it will permit said first means to assume its normal position, its projecting portion will be in adjacency to said casing.

13. In combination, a magnetic motor, a casing therefor, a member slidably mounted in said casing and having a portion thereof adapted to project out of the casing when said member is slid into one limiting position thereof and to merge with the outline of said casing so as to be shielded thereby when said member is in its opposite limiting position, a motor starting device within said casing and means on said member adapted to act on said motor starting device to start the motor when said member is moved outward into its said first-mentioned limiting position and then moved back again into its second limiting position.

14. In a motor starter for a magnetic motor, movable means for bringing the armature of the motor into a starting position, said means being automatically movable into a normal position permitting the operation of the motor after the armature has been brought into its starting position, and a second movable means movable into either one of two limiting positions, and adapted, when moved into one of its limiting positions, to move said first mentioned means so as to cause it to move said armature into the said starting position, and when moved into its other limiting position to permit said first mentioned means to assume its position permitting the operation of the motor.

15. In a shaving device, a magnetic motor, a casing substantially enclosing said motor, movable means for bringing the armature of the motor into a starting position, said means being automatically movable into a normal position permitting the operation of the motor after the armature has been brought into its starting position, and a second movable means movable into either one of two limiting positions, and adapted, when moved into one of its limiting positions, to move said first mentioned means so as to cause it to move said armature into the said starting position, and when moved into its other limiting position to permit said first mentioned means to assume its position permitting operation of said motor, and portions of said casing being arranged to shield said second means when it is in said last mentioned position.

16. In a starter for a magnetic motor, a pair of electrical controls in the motor circuit adapted to separate when released so as to open the motor circuit, but adapted to close the motor circuit when the contacts are pressed together, means adapted when moved from its normal position to bring the armature of the motor into a self-starting position, said means when in its normal position being adapted to press said contacts together, and when moved from its normal position to release said contacts so as to permit them to separate and to move the motor armature into a self-starting position after the contacts have separated and thereby broken the motor circuit.

17. In a starter for a magnetic motor, said motor having a rotatable shaft carrying an armature, means for bringing the armature into a starting position, said means comprising a V-shaped cam surface on said shaft and means adapted in one of its positions to engage said cam surface so as to bring said armature into a starting position and simultaneously to open the electrical circuit of the motor, and in another of its positions to release the armature and to close the electrical circuit of the motor.

GODFREY DALKOWITZ.